US006786697B2

(12) United States Patent
O'Connor et al.

(10) Patent No.: US 6,786,697 B2
(45) Date of Patent: Sep. 7, 2004

(54) TURBINE (75) Inventors: Arthur Benjamin O'Connor, Cnr. Brook and Barkly Street, Sunbury., Victoria 3429. (AU); Tom Lundgaard Pedersen, South Yarra (AU)

(73) Assignee: Arthur Benjamin O'Connor, Victoria (AU)

( * ) Notice: Subject to any disclaimer, the term of this patent is extended or adjusted under 35 U.S.C. 154(b) by 0 days.

(21) Appl. No.: 10/448,310

(22) Filed: May 30, 2003

(65) Prior Publication Data

US 2003/0223858 A1 Dec. 4, 2003

(30) Foreign Application Priority Data

May 30, 2002 (AU) .............................. PS2667

(51) Int. Cl.⁷ ................................ F03D 1/06
(52) U.S. Cl. ...................... 416/189; 416/187; 416/188; 416/DIG. 3; 415/2.1; 415/4.1
(58) Field of Search .......................... 415/2.1, 4.1, 228, 415/905; 416/185, 188, 189, 186 R, 187, 195, DIG. 3

(56) References Cited

U.S. PATENT DOCUMENTS

| 1,433,995 A | * | 10/1922 | Fowle ......................... 415/2.1 |
| 2,360,440 A | * | 10/1944 | Muller et al. ............... 416/188 |
| 2,434,896 A | | 1/1948 | Ayers |

(List continued on next page.)

FOREIGN PATENT DOCUMENTS

| AU | 563265 | | 9/1982 |
| AU | PCT/AU03/00683 | | 5/2003 |
| DE | 455854 A | * | 11/1928 |
| DE | 3943075 | | 7/1991 |
| DE | 4030559 | | 4/1992 |
| WO | WO 87/07328 | | 3/1987 |
| WO | WO 91/04413 | | 4/1991 |
| WO | WO 00/75507 | | 12/2000 |

OTHER PUBLICATIONS

Blackwell, et al., Sandia National Laboratories Report No. SAND76–0131, Jul. 1997 (from Figure 15 of that report).
Worstell, Sandia National Laboratories Report No. SAND79–1753, (from Figure 2 of that report).
Akbarzadeh, et al., Royal Melbourne Institute of Technology, Australia, Department of Manufacturing and Process Engineering: A Report On Wind Tunnel Testing And Performance Characteristics Of Cobden Aerogenerators (no date).
Aerodynamic Theory, vol. IV, editor W.F. Durand, Dover Publications Inc, Division L, Chapter 11, Figure 103, 1963, p. 324–341.

*Primary Examiner*—Christopher Verdier
(74) *Attorney, Agent, or Firm*—Eitan, Pearl, Latzer & Cohen Zedek, LLP (57) ABSTRACT

A fluid turbine for extraction of power from a moving fluid, and that is particularly suitable for use as a wind turbine. The fluid turbine includes, for example, a rotor mounted to a support structure for rotation about a horizontal axis, the rotor having multiple blades extending forwardly and outwardly from a hub, and may include a ring fairing secured to the blades at their outer ends and rotatable with the blades about the axis. The ring fairing may be cocentric with the axis of rotation and may have, at at least one peripheral location thereon, a radial cross-section shaped to develop in operation a circulatory flow about the cross section in such a direction as to increase the velocity of fluid flow between the ring fairing and said hub. In one preferred embodiment of the turbine, the ring fairing cross-sectional shape is an airfoil-section, with a chamber line that is concave outward and forward. Alternatively, the ring faking cross-sectional shape is arcuate, being concave outward and forward. The combination of the ring fairing as disclosed and the forwardly and outwardly directed blades is found to be surprisingly effective.

18 Claims, 10 Drawing Sheets

U.S. PATENT DOCUMENTS

| | | | |
|---|---|---|---|
| 3,209,156 A | | 9/1965 | Struble, Jr. |
| 3,228,475 A | * | 1/1966 | Worthmann ................ 416/188 |
| 3,838,835 A | * | 10/1974 | Kling ........................ 416/189 |
| 4,017,205 A | | 4/1977 | Bolie |
| 4,021,135 A | | 5/1977 | Pedersen et al. |
| 4,075,500 A | | 2/1978 | Oman et al. |
| 4,080,100 A | | 3/1978 | McNeese |
| 4,086,498 A | | 4/1978 | Szoeke |
| 4,132,499 A | | 1/1979 | Igra |
| 4,143,992 A | | 3/1979 | Crook |
| 4,147,472 A | * | 4/1979 | Kling ........................ 416/189 |
| 4,159,191 A | | 6/1979 | Graybill |
| 4,289,450 A | * | 9/1981 | Kling ........................ 416/189 |
| 4,324,985 A | | 4/1982 | Oman |
| 4,362,469 A | * | 12/1982 | van Holten ................ 416/191 |
| 4,415,306 A | * | 11/1983 | Cobden ...................... 416/189 |
| 4,422,820 A | | 12/1983 | Kirsch et al. |
| 4,501,089 A | * | 2/1985 | Cobden ...................... 416/187 |
| 4,684,316 A | | 8/1987 | Karlsson |
| 4,781,523 A | * | 11/1988 | Aylor ........................ 415/905 |
| 4,863,350 A | * | 9/1989 | Quarterman ................ 416/189 |
| 4,915,580 A | | 4/1990 | Obidniak |
| 5,591,004 A | | 1/1997 | Aylor |
| 5,630,705 A | | 5/1997 | Eikelenboom |
| 5,632,599 A | | 5/1997 | Townsend |
| 5,707,209 A | * | 1/1998 | Iyer et al. ............... 416/186 R |
| 5,743,712 A | | 4/1998 | Ayor |
| 5,863,180 A | | 1/1999 | Townsend |

* cited by examiner

TURBINE

CROSS REFERENCE TO RELATED APPLICATIONS

This application claims priority from Australian Application PS2667, filed May 30, 2002.

FIELD OF THE INVENTION

The present invention relates generally to a fluid turbine. In particular, the invention concerns a wind turbine, although it may also be driven by other fluids such as water.

BACKGROUND OF THE INVENTION

Machinery for extracting power from the wind has been known for centuries. Early types, known as windmills, were used to power mills for grinding grain and for similar applications. They typically had a rotor with a number of radial blades or fabric sails and means for orienting the rotor to face into the wind when required and for "feathering" or furling the blades or sails when not required or in strong winds. They were of low sophistication and low efficiency. Many were of considerable size in order to generate useful quantities of mechanical power.

Agricultural and other applications in which operation of mechanical devices such as pumps was required led to development of new and improved machines for harnessing wind power. An example still widely seen is the ordinary "windmill" used for pumping well water for farm stock. Such machines typically have a rotor with a number of simple sheet metal blades thereon, and drive mechanical equipment directly through gearing. They were (and are) typically smaller in rotor diameter and more efficient than the earliest windmills and their rotors operate at somewhat higher speeds. Vane arrangements are provided to face the rotor into the wind and to orient it suitably to avoid damage in high winds.

With the development of electrical technology, machines were developed to convert wind power to electrical power through generators. This trend began with small scale machines, used for remote area power supply, but has now become much more important, with many machines of large scale being used to supply large-area power grid systems alongside coal-fired and other types of power stations. Improving understanding of fluid flow in the 19th and 20th centuries has led to the development of new types of machines and to better design techniques. The term "windmill" is giving way to "wind turbine" for most applications as the machines themselves have developed in sophistication and scale.

Although machines have been developed in which the axis of rotation of the rotor is vertical (e.g. the Darrieus and Savonius types well known in the art), the most common wind turbine type has a rotor with a horizontal axis of rotation and a small number of radial blades, so that the rotor appears similar to an aircraft propeller. Such horizontal axis wind turbines have been built in very large sizes and with great sophistication in their design.

However, the use of large numbers of turbines of this type for power generation is still marginal economically and is controversial, due to their size, their often unattractive appearance, their noise and even their interference with radio-frequency transmissions caused by the large rotating blades. Also, their sophistication in itself has the problem that ongoing maintenance can be expensive and difficult, greatly affecting life-cycle costs and even their ability to be used in some places where suitable people to maintain them are not available.

The present invention is intended to address these problems. The wind turbine disclosed herein is comparatively simple, robust, easy and comparatively cheap to manufacture and maintain in the intended sizes. Yet it is believed to have surprisingly good efficiency and so to be able to provide useful amounts of power in the intended size and cost range. Further, it is believed to have satisfactory noise characteristics, and a reasonable appearance. While not necessarily of the theoretically highest possible efficiency, it is believed that the wind turbine of the present invention provides a useful alternative to other types available due to this combination of properties.

PRIOR ART

The present invention was conceived in an attempt to improve on the wind turbine disclosed by Cobden in U.S. Pat. No. 4,415,306 and Australian Patent No. 563265 (hereinafter referred to as the Cobden wind turbine). As described below, this machine differed radically from conventional horizontal-axis wind turbines of the "high speed" type having two or three radial propeller-style blades often used for electric power generation, and of the "low speed" type having a larger number of radial blades and typified by the agricultural windmill used for pumping water. Although quiet and visually acceptable, it was believed that the Cobden turbine's performance could be improved.

Wind turbines similar to the Cobden turbine were disclosed by Aylor in U.S. Pat. No. 4,781,523 as offering higher efficiency. One embodiment, very similar to the Cobden turbine, had multiple blades arranged peripherally on a rotor with their lengths parallel to the rotation axis of the rotor with fairings provided for causing air to flow radially through the blades. In another embodiment, the rotor had blades extending forwardly and outwardly from a hub, with air flowing outwardly and backwardly through the blades. In both embodiments, particular relationships between air inlet and outlet areas and flow directions were specified, as discussed further below. Neither embodiment was considered particularly cheap or simple to manufacture, due to the required shape of the flow deflector(s) and rotor support body. U.S. Pat. No. 4,684,316 (Karlsson) discloses a somewhat similar arrangement that was felt likely to have high cost in large sizes and high aerodynamic losses from the non rotating parts upstream of the rotor.

Many Wind turbines have been disclosed in which higher efficiency than in conventional types was to be obtained by enclosing a bladed rotor in a duct with a diffuser section downstream of the rotor. These enable faster flow through the blading which can accordingly be more effective in generating power, and reduce blading tip losses. Some examples are in U.S. Pat. Nos. 4,021,135, 4,075,500, 4,132, 499, 4,324,985, 4,422,820.

However, Kling, in U.S. Pat. No. 4,147,472, points out that the costs of most ducted arrangements tend to make their economics unattractive, even where performance improvement is obtained. Kling discloses a shrouded rotor of very small size, with a shroud in the form of a ring with an airfoil cross section developing lift forces that act radially inward. This ring is secured to, and rotates with, radial blades of conventional type. The ring is little longer in the flow direction than the blades themselves, and so can be relatively inexpensive. The effect of the shroud is stated to be to develop a toroidal vortex which increases the flow velocity through the blades without the need for a long diffuser downstream of them. The shroud is disclosed as an adjunct to conventional radial blade wind turbine rotors.

SUMMARY OF THE INVENTION

According to the invention there is provided a fluid turbine for extraction of power from a moving fluid, including:

a rotor mounted to a support structure for rotation about a horizontal axis, said rotor having a plurality of blades extending forwardly and outwardly from a hub.

a ring fairing secured to said blades at outer ends thereof and rotatable with said blades about said axis, said ring fairing being concentric with said axis of rotation, wherein said ring fairing has at at least one peripheral location thereon a radial cross-section shaped to develop in operation of said turbine a circulatory flow about said cross section in such a direction as to increase the velocity of fluid flow between said ring fairing and said hub.

It is preferable that at said at least one peripheral location on said ring fairing said ring fairing develops in operation of said turbine an aerodynamic force directed inwardly and rearwardly of said ring fairing.

Preferably, said ring fairing is of uniform cross section around substantially the entire periphery of said ring fairing.

In a particularly preferred embodiment, said ring fairing cross section is so shaped, sized and oriented that said circulatory flow is sufficient to at least partly offset that change in direction of fluid flow relative to a said blade due to the increase of tangential velocity of the blade with increasing radius of said blade.

The said hub may be of substantially conical shape, with a vertex angle in the range 60 degrees to 120 degrees, More preferably, said vertex angle is in the range 80 degrees to 100 degrees. A conical hub has the advantage of ease of manufacture.

The trailing edges of said blades in operation of said turbine preferably sweep out an at least approximately conical surface. The said conical surface preferably intersects an external surface of said hub at approximately 90 degrees when both said surfaces are seen in a cross section in a radial plane that includes said axis of rotation. This best ensures that flow near the inner ends of the blades is substantially transverse to them. However, the said conical surface may intersect an external surface of said hub at an angle in the range of approximately 75 degrees to 90 degrees when both said surfaces are seen in cross section in a radial plane that includes said axis of rotation.

It is considered satisfactory (although not essential) for each said blade to be of substantially constant cross-sectional shape along its length.

Each said blade may be of airfoil-shaped cross-sectional shape. However, each said blade may be formed of a sheet material and have a cross-sectional shape that is arcuate. This can be a satisfactory approximation to an airfoil section, and gives the advantage of ease of construction.

At least when low cost is desirable, each said blade is preferably substantially untwisted along its length.

It is preferred that the ring fairing cross section is at least approximately of airfoil shape. Preferably, said airfoil shape has a camber line that is concave on a side thereof that is opposite to the blades. However, the ring fairing may be formed of sheet material with said ring fairing cross section being of arcuate shape. It is then preferable that said arcuate shape is concave on a side thereof opposite to the blades.

In a preferred embodiment, said ring fairing cross section has a leading edge and a trailing edge and the distance when viewed in a radial plane including said axis of rotation between said leading and trailing edges is less than twice the maximum chord length of each said blade. That is, the ring fairing is of quite small dimension in the fluid flow direction.

BRIEF DESCRIPTION OF THE DRAWINGS

The invention will now be described in more detail by reference to the preferred embodiment although the embodiment described is not intended to limit the scope of the invention. Reference is made to the attached Figures, of which.

DETAILED DESCRIPTION OF PREFERRED EMBODIMENT

Figure 1:
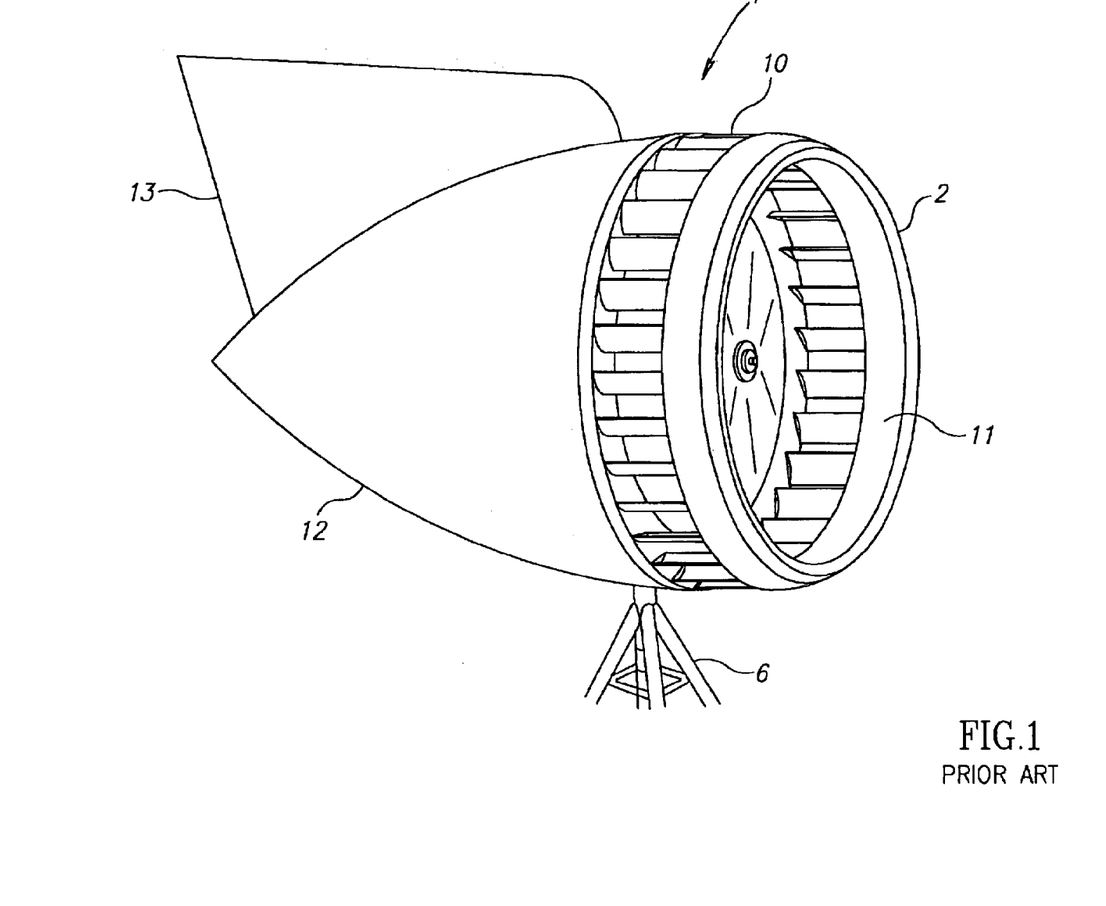
FIG. 1 is a perspective view of a prior art wind turbine.
Figure 2:
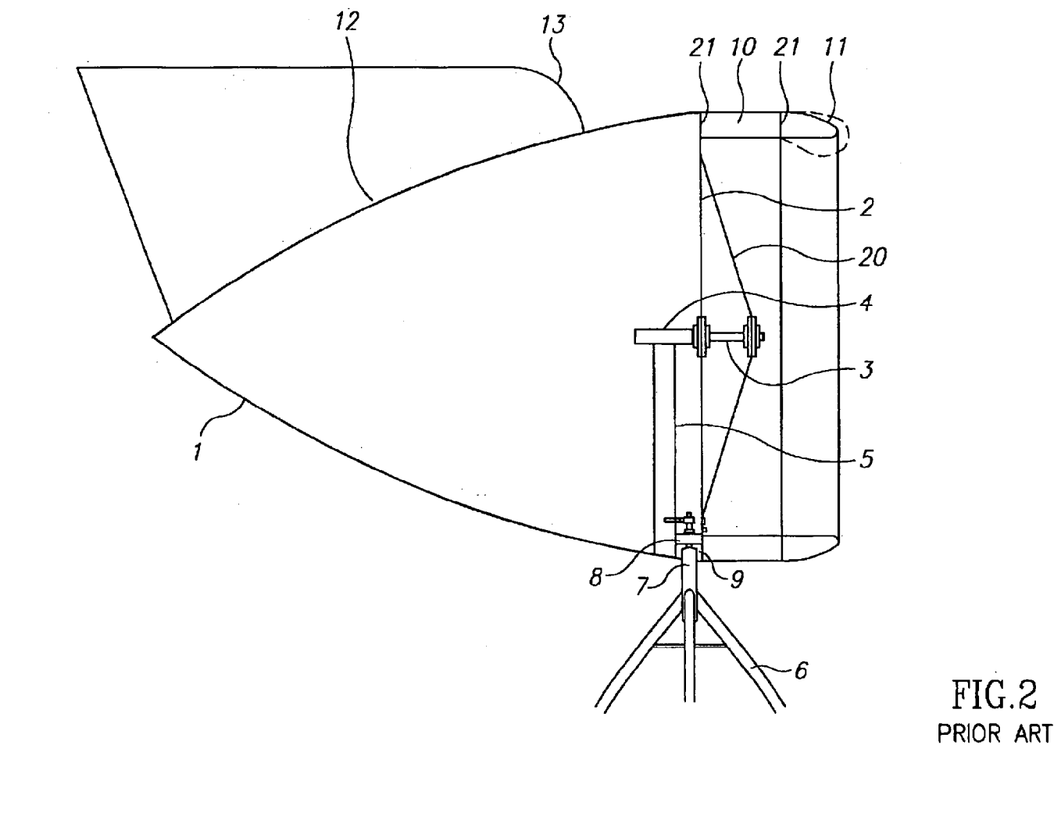
FIG. 2 is a cross-sectional view of the wind turbine shown in FIG. 1 taken on a vertical plane including the rotational axis of the turbine's rotor.

FIGS. 1 and 2 show a wind turbine 1 as disclosed by Cobden in U.S. Pat. No. 4,415,306 and Australian Patent No. 563265 (the Cobden wind turbine).

Referring to these Figures, there is shown a turbine unit 1 having a turbine wheel 2 mounted on a shaft 3 supported by a bearing 4. The bearing 4 is supported on a frame 5, the turbine unit 1 being mounted on a shaft supported on a bearing 7. The drive from the turbine wheel 2 is, in this embodiment, a friction wheel 8 attached to a drive shaft 9 which passes downwardly through a pedestal 6 and from which motive power may be obtained.

The turbine wheel 2 carries a plurality of blades 10 to which are attached a forward fairing 11. The blades 10 are attached to the turbine wheel 2 and extend forwardly, carrying at their forward ends the fairing 11 which thus rotates with the blades 10. In this example the blades 10 are formed of sheet metal with end flanges 21 by which the blades 10 are mounted on the turbine wheel 2 and to which the fairing 11 is attached.

The turbine wheel 2 is also provided with a conical deflecting surface 20 which also is mounted on the shaft 3 and joins to the turbine wheel 2 adjacent the blades 10.

The turbine unit 1 further includes a hollow aerodynamically shaped body 12, a tail portion 13 being provided so that the turbine unit 2 will be quickly and continuously orientated into the prevailing airflow (i.e. with shaft 3 aligned with the airflow direction).

Two advantages of the Cobden turbine 1 over previous wind turbines were its relatively simple construction, particularly in relation to the shape of the blades, and its quiet operation. It was considered desirable to maintain these advantages in developing a superior wind turbine.

Figure 3:
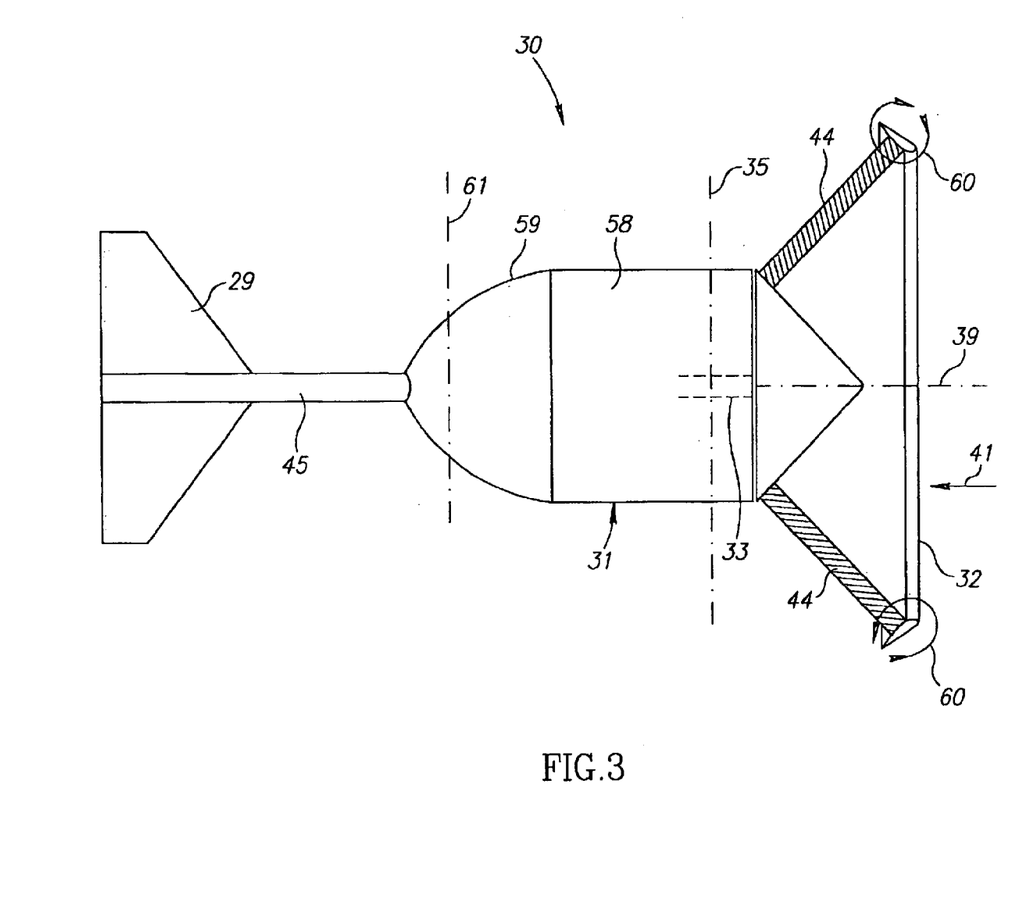
FIG. 3 is a side elevation, partially sectioned, of a wind turbine according to the present invention taken on a vertical plane including the rotational axis of the turbine's rotor.

Referring now to FIG. 3, there is shown a wind turbine 30 according to a preferred embodiment of the present invention in a view equivalent to the view of FIG. 2. The wind turbine 30 includes a number of features which are similar to those of the Cobden wind turbine shown in FIGS. 1 and 2. However, several features are significantly different.

Figure 4:
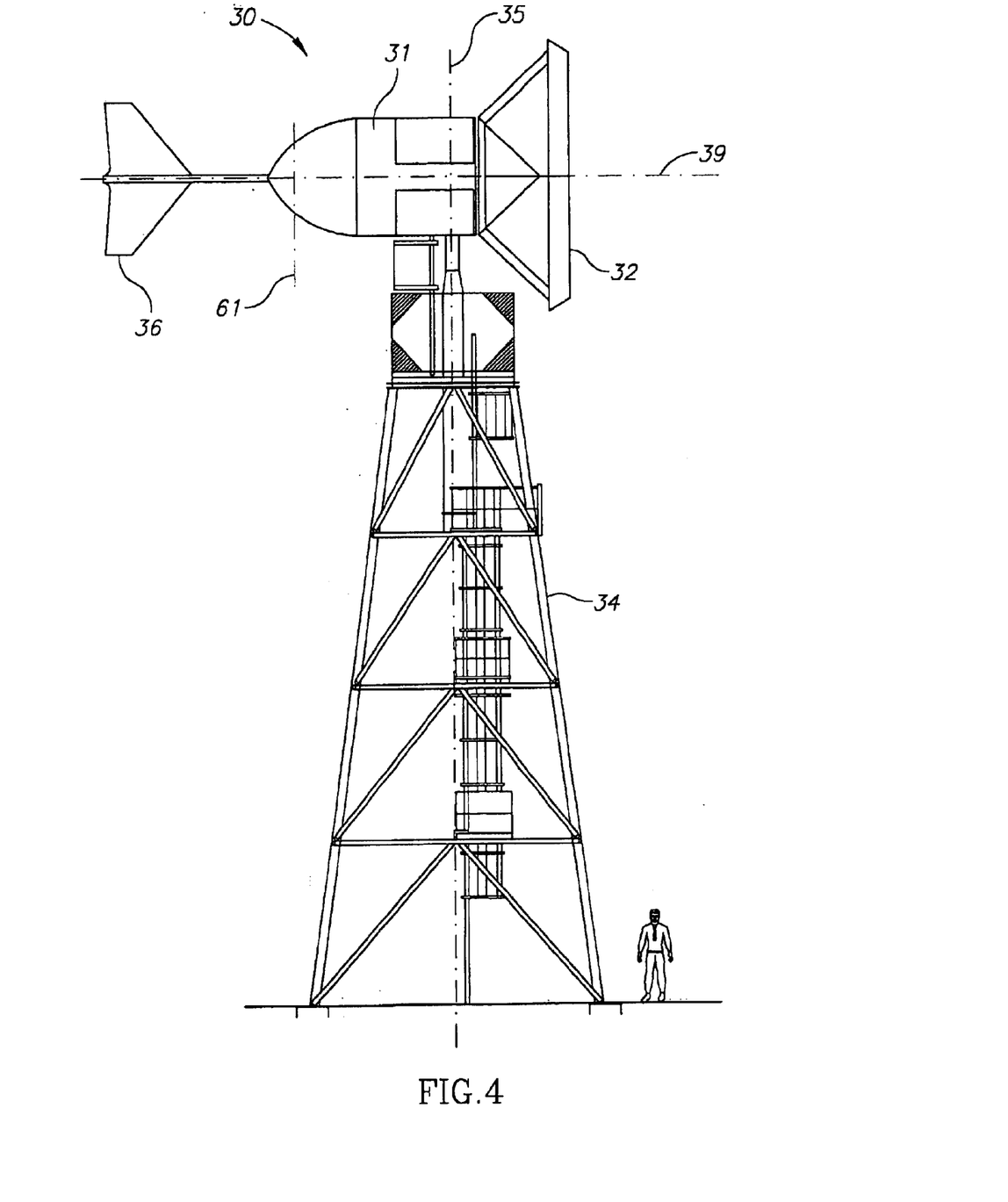
FIG. 4 is a side elevation of the wind turbine shown in FIG. 3, mounted on a tower for use.
Figure 5:
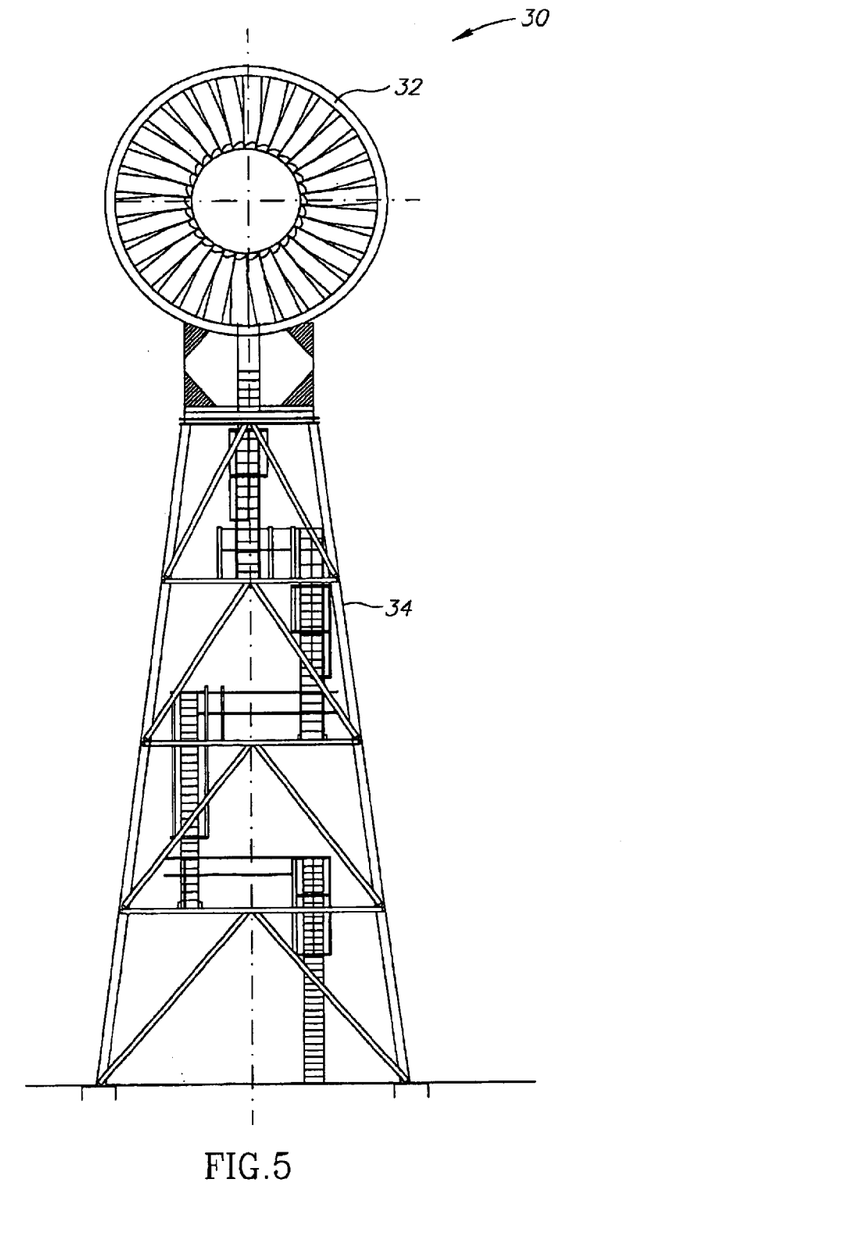
FIG. 5 is a front elevation of the wind turbine shown in FIG. 3, mounted on a tower for use.

Similarly to the Cobden turbine 1, the wind turbine 30 includes a hollow body 31. A rotor 32 is mounted on a shaft 33 at a forward end of the body 31 and the shaft 33 is supported on bearings (not shown) within the body 31 for rotation about an axis 39. The shaft 33 can be used to drive an electric generator, pump or other power-consuming device (not shown) as required, in known manner. FIGS. 4 and 5 show the turbine 30 mounted atop a tower 34 for use. The turbine 30 is mounted to be rotatable about a vertical axis 35 in the tower, and a tail unit 29, mounted on a boom 45, is provided to ensure automatic orientation of turbine 30 to the wind direction 41, i.e. with shaft 33 and the wind direction 41 aligned, in known manner. The tail unit 29 and boom 45 are arranged to be able to be pivoted about a vertical axis 61 to provide for a variable angle between axis 39 and the wind direction when required, to avoid overspeed in high wind conditions or up to a point where the rotor ceases to rotate altogether to avoid damage in extreme conditions. A suitable controller (not shown) based on a microprocessor or the like is preferably provided, and programmed to vary the angle automatically when the turbine 30 is in use, by operating a suitable mechanical drive (not shown) which pivots the tail unit 29 and boom 45.

Axis 39 remains horizontal in use.

Rotor 32 includes a conical hub 36, and extending both outwardly and forwardly from the hub 36 a number of blades 37. Blades 37 are not shown individually in FIG. 3 or in FIG. 4. Instead there is shown in cross-section on a vertical plane including axis 39, a volume 44 (shown by cross hatching) in the shape of a conical surface that is swept out by the blades 37 as rotor 32 rotates. Each blade 37 is secured at its forward and outer end to a ring fairing 38 that is concentric with axis 39 and hub 36, so that ring fairing 38 rotates with the hub 36 and blades 37 The plane of ring fairing 38 is perpendicular to axis 39.

Figure 6:
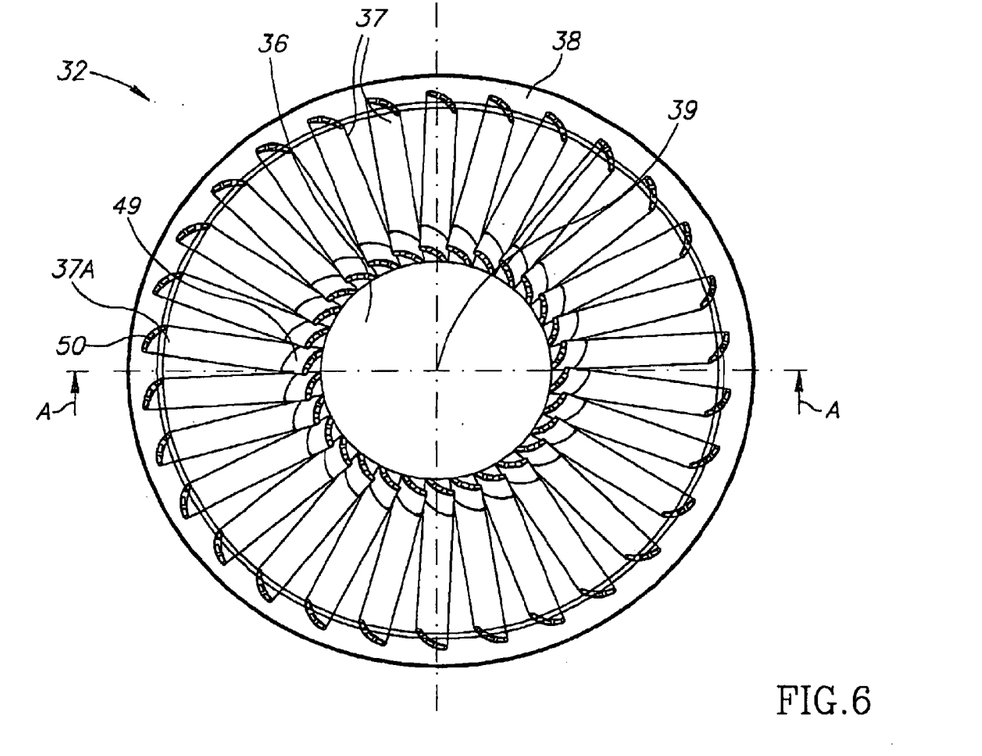
FIG. 6 is a front elevation of the rotor of the wind turbine shown in FIG. 3, with hidden outlines of some blades of the rotor visible.
Figure 7:
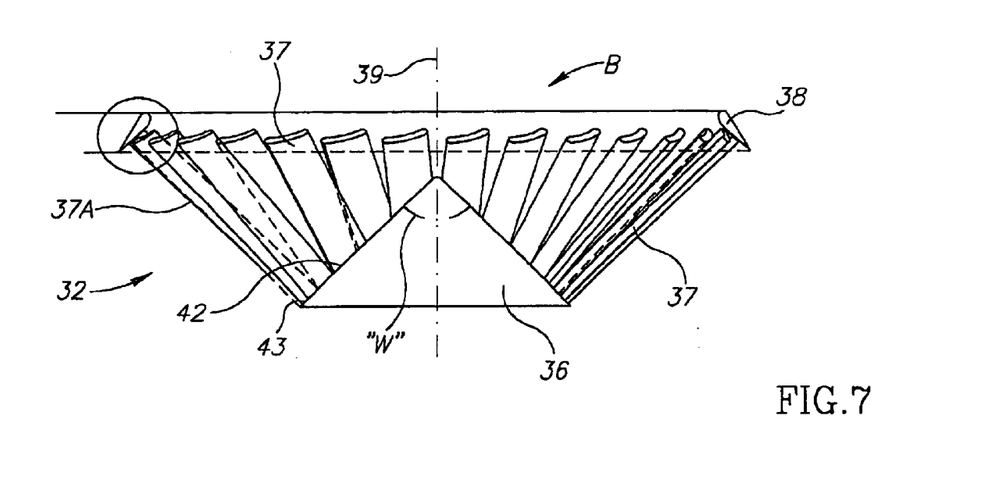
FIG. 7 is a cross-sectional view of the rotor shown in FIG. 6, taken at station "AA" in that Figure.

FIGS. 6 and 7 show the rotor 32, only, in front and side elevations, now with individual blades 37 shown. Some hidden lines have been left in FIGS. 6 and 7, and in FIG. 7 structural detail inside hub 36 has been omitted. Thirty (30) blades 37 are provided. Blades 37 are peripherally equispaced, of constant chord and have no twist along their length. Blades 37 extend almost perpendicularly from the conical surface 42 of hub 36 close to the rear edge 43 of hub 36. The hub 36 is in the form of a cone with a vertex angle "w" of 90 degrees.

Figure 8:
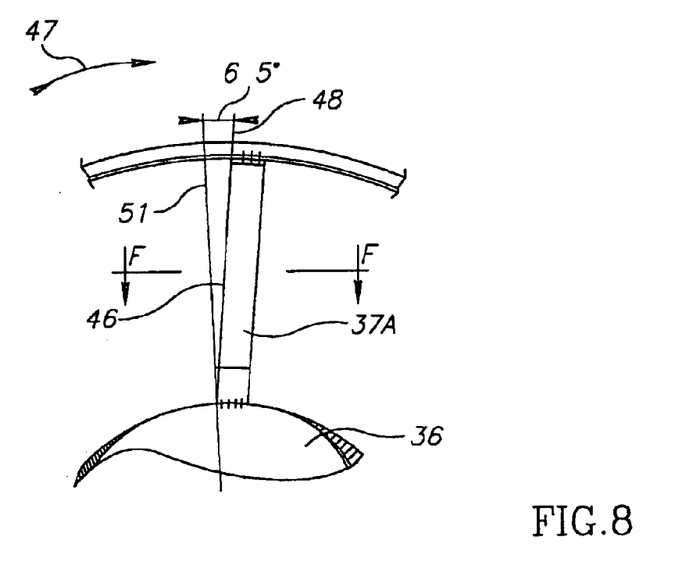
FIG. 8 is a partial view of the hub and one blade of the rotor shown in FIG. 7, looking in the direction of arrow "B" in that Figure.

FIG. 8 shows one blade 37a on hub 36. All blades 37, including blade 37a, are identical and identically mounted to hub 36. Blade 37a is mounted so that its trailing edge 46 is angled at 6.5 degrees to a radial plane 51 which contains axis 39, when viewed in the direction of arrow "B". Arrow 47 shows the direction of rotation of rotor 32. Trailing edge 46 during rotation of rotor 32 sweeps out a conical surface with a vertex angle of 90 degrees.

Figure 9:
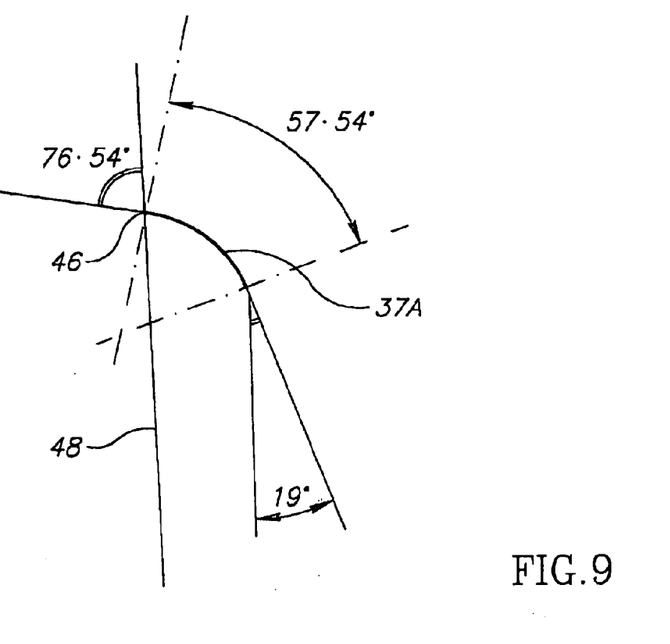
FIG. 9 is a cross-sectional view of the blade shown in FIG. 8 taken at station "FF" in that Figure.

FIG. 9 is a cross-sectional view of blade 37a (only) showing that the constant cross section of blade 37a is a simple sector of a circle. Also shown is the angular position of blade 37a relative to an imaginary plane 48 containing the trailing edge 46 and a line 51 from the vertex of hub 36 along its conical surface to the trailing edge 46 of blade 37a. Blades 37, being simple circular arcs in cross-section, are readily made in sheet metal, for simplicity and low cost. As shown, each is spot welded to a blade root mounting bracket 49 and a blade tip mounting bracket 50, brackets 49 and 50 being bolted respectively to hub 36 and ring fairing 38. Note that blades 37 could be made from sheet material with arcuate shapes in which the radius of curvature varies between leading and trailing edges.

Figure 10:
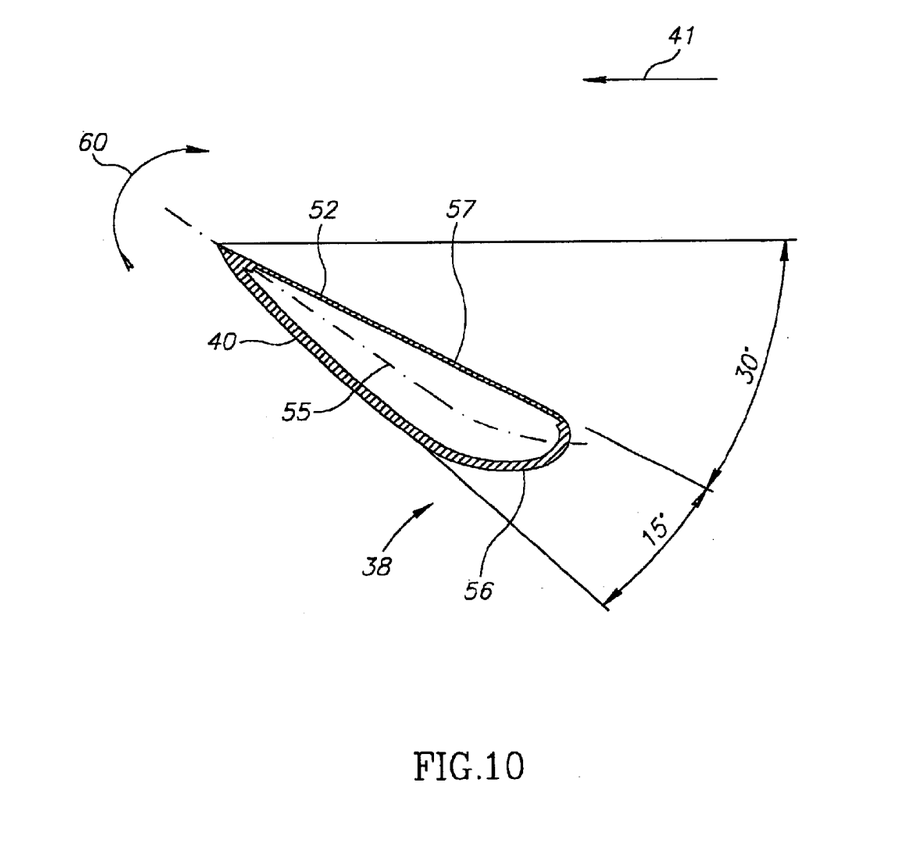
FIG. 10 is a cross-sectional view, at one peripheral point, of a ring fairing of the rotor shown in FIG. 7.

FIG. 10 shows a cross-section, at a typical peripheral point of the ring fairing 38. When seen in cross-section across its diameter, ring fairing 38 has the shape of an airfoil section 40, arranged so that any aerodynamic lift force developed at a point on ring fairing 38 is directed inwardly and backwardly, when axis 39 is aligned with the wind direction 41. Ring fairing 38 has the same airfoil cross-section 40 around its entire periphery. A frusto-conical outer surface 52 of aerofoil section 40 is in section at an angle of 30 degrees to the direction of axis 39. Camber line 55 of airfoil section 40 is convex inward and backward, so that aerodynamic lift forces are directed inwards and backwards. For a wide range of sizes, a suitable method of providing ring fairing 38 with an airfoil section 40 is to use a fibreglass moulding 56 and a sheet metal ring 57. However, many other possibilities will be apparent to persons skilled in the art. It is thought that even a simple sheet metal ring, formed with a camber line similar to camber 55, may give reasonable performance at reduced cost.

Hollow body 31 of wind turbine 30 has a simple cylindrical forward part 58 and a faired rear section 59. Note that forward part 58 is not faired to blend with the contour of hub 36. This measure allows for a smaller and less expensive hollow body than would otherwise be required.

The specific geometry of the turbine 30 as described above was used in a detailed computer simulation of its performance. This approach can today provide credible estimates of actual turbine performance. The same was done for the Cobden turbine as described in U.S. Pat. No. 4,415,306. The computed performances of turbine 30 and the Cobden turbine were compared with each other and with published data on some other wind turbine types.

As is well known in the art, a wind turbine can be compared rationally with others by determining its dimensionless power coefficient as a function of its dimensionless tip speed ratio. If these quantities are consistently defined between machines, they can be directly compared without regard to size.

The dimensionless power coefficient $C_p$, is defined as, $$C_p = \frac{P}{\frac{1}{2}\rho A u^3}$$

and the dimensionless tip speed ratio TSR, as, $$TSR = \frac{R_o \omega}{u}$$

where:
P is the generated power,
$\rho$ is the density of air,
A is the projected area of the turbine normal to the free stream flow,
u is the free stream wind speed,
$R_o$ is the outside radius of the generator, and
$\omega$ is the angular velocity of the blade annulus.

Figure 11:
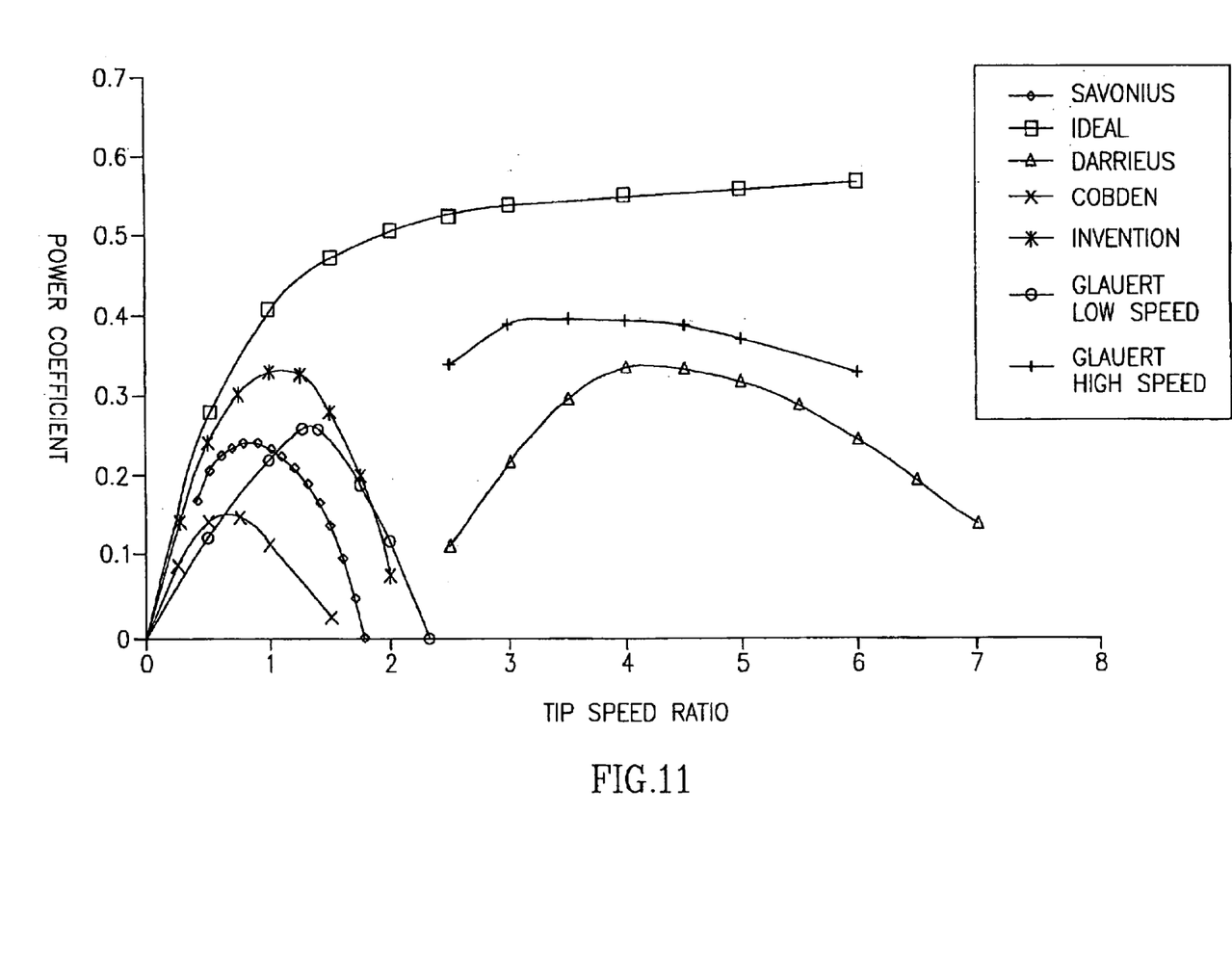
FIG. 11 is a graph comparing the power coefficients of several wind turbines including the wind turbine shown in FIG. 3.

FIG. 11 shows the results of the comparison, of the performances of the wind turbine here disclosed, certain others known in the art, and an "ideal" result The curves shown are as follows;

"Savonius"—wind tunnel tests of a two blade Savonius rotor reported by Blackwell et al, in Sandia Laboratories Report No. SAND76-0131, July 1997 (from FIG. 15 of that report);

"Darrieus"—full-size field data for a 17 m-high Darrieus-type wind turbine reported by Worstell in Sandia National Laboratories Report No. SAND79-1753 (from FIG. 2 of that report);

"Cobden"—wind tunnel tests of a model Cobden turbine reported by Akbarzadeh et al of Royal Melbourne Institute of Technology, Australia, Department of Manufacturing and Process Engineering.

"Glauert Low Speed" and "Glauert High Speed"—model test results for slow- and fast-running wind turbines of the conventional propeller type, cited by Glauert in "Aerodynamic Theory", W. F. Durand editor, Dover Publications Inc, Division L, Chapter 11, FIG. 103 (with Power Coefficient values adjusted to compensate for a different definition of that quantity used by Glauert, and so to allow for correct comparison with the other curves shown);

"Ideal"—theoretical performance limit for an ideal wind turbine of the conventional propeller type, as shown also by Glauert in FIG. 103 of the above preference;

"Invention"—an estimated performance curve prepared by WBM Pty Ltd, consulting engineers, from results of their computational fluid dynamics simulations of the wind turbine disclosed herein, made using FLUENT 5.5 software.

Simulations of the Cobden wind turbine model were also made by WBM Pty Ltd, using the proprietary software known as FLUENT 5.5, as a check and showed good agreement with the experimental results plotted in FIG. 11.

The significance of the "Ideal" curve should be noted. It is based on the simplified theory of propeller-type wind turbines due to Betz (see the Glauert reference mentioned above for a description of this theory) and is in effect an upper envelope of the peak power coefficients that such machines could approach if "ideal" performance could actually be obtained. A propeller-type Wind turbine, particularly one with fixed blade geometry, can not be expected to approach this curve throughout the tip speed ratio range, a point illustrated by the differences in the results for the high-speed and low speed machines given by Glauert. The curves in FIG. 11 (other than the "Ideal" curve) are for particular rotor geometries, and are believed to be representative of practice in the art. However, all of the curves can be modified to some degree by modifying rotor geometry.

FIG. 11 shows that wind turbine 30 is expected to have a much better power-generating performance than the Cobden and Savonius turbines. Further, the performance is generally better than the slow running machine cited by Glauert. At a tip speed ratio of 1, approximately 80% of the maximum power available (based on the "Ideal" curve) is delivered. Turbines designed for comparatively high tip speed ratios are known generally to have higher efficiencies, but tend also to have lower starting torque (see Glauert, in the citation given above), the latter being a disadvantage in practice due to problems of starting in light winds. A further advantage of low speed machines is that they can be more robust, reliable and easier to maintain, as illustrated by ordinary farm Windmills. (Glauert's low speed example may be representative of such windmills.)

Even allowing for the fact that a modern, low speed conventional design might perform somewhat better, than the one cited by Glauert, the expected performance of wind turbine 30 is surprising, and especially given the simplicity of the present turbine's design, e.g. its use of simple untwisted blades, and the simple shapes of hollow body 31 and hub 36. No doubt still further improvement could be obtained by the use of more complex airfoil section blades where the cost is justified.

Figure 12:
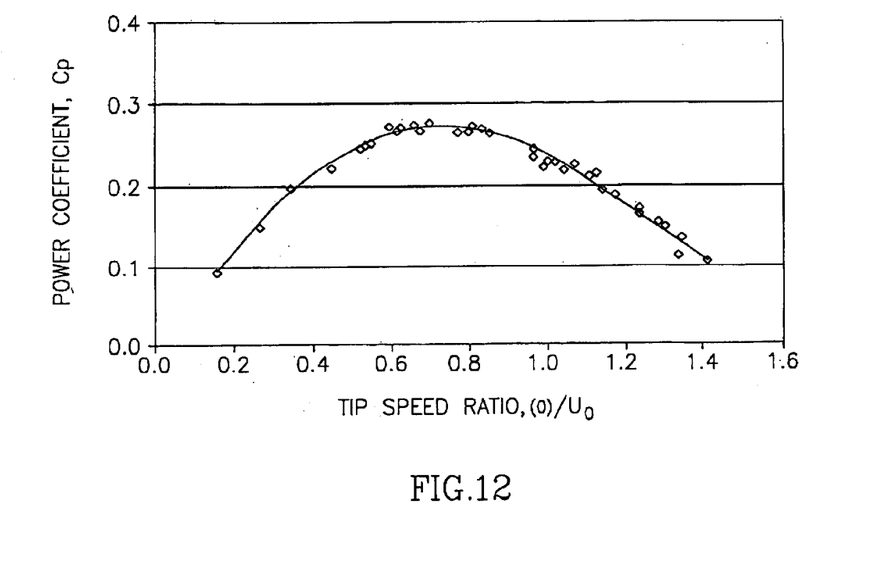
FIG. 12 is a graph showing the power coefficient as a function of tip speed ratio for a scale model of the rotating part of the turbine shown in FIG. 3 at an absolute wind speed of 41 kph.
Figure 13:
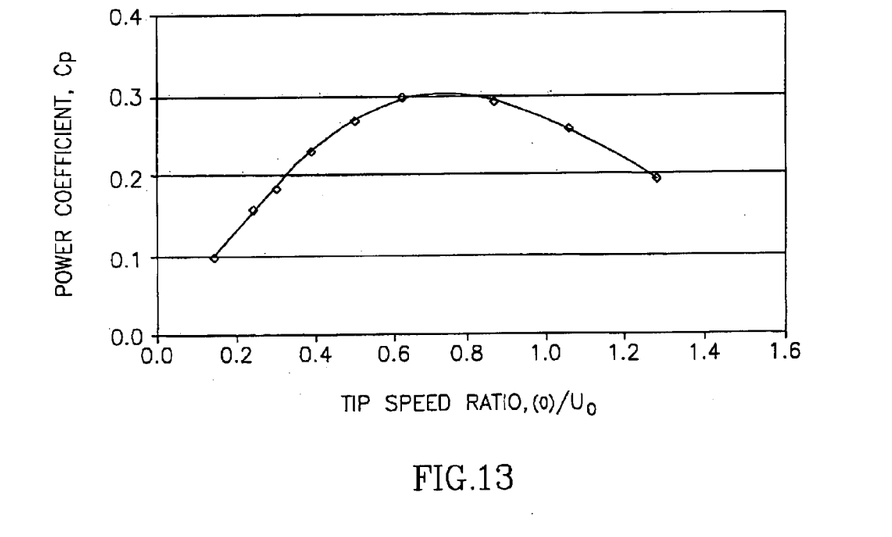
FIG. 13 is a graph showing the power coefficient as a function of tip speed ratio for a scale model of the rotating part of the turbine shown in FIG. 3 at an absolute wind speed of 46 kph.

To at least partially confirm the performance of the wind turbine of FIG. 3 a scale model of the rotating part was made and tested in a large wind tunnel. The model linear scale factor was 13.7% of full size. Power coefficient was measured as a function of tip speed ratio (both quantities being defined as above) at several absolute wind speeds (corrected for tunnel blockage). FIGS. 12 and 13 show the results obtained at corrected absolute wind speeds of 41 kph and 46 kph respectively. The two sets of results correspond to Reynolds Numbers (based on the tip chord of the fan blades) of $32.9 \times 10^3$ and $36.9 \times 10^3$ respectively. Reynolds number is an indication of the relative importance of aerodynamic forces and air friction forces, and is made as large as possible in such small scale tests to approach as far as possible that of a full scale machine. (It is not normally possible to achieve the full scale Reynolds Number.) The results for the two Reynolds Numbers do differ, In such a direction as to suggest (by extrapolation) that still higher performance might be expected from a full scale machine (because the better performance was obtained at the higher Reynolds Number). The results show that the turbine of FIG. 3 can be expected to have an excellent performance. This is shown by comparison of the results with the results plotted in FIG. 11.

The following is a description of the operation of wind turbine 30, and the factors thought most likely to account for its for its surprisingly good performance.

When turbine 30 is facing into the wind, air flows in the direction of axis 39 through ring fairing 38. It is then deflected into a generally conical path by hub 36, and flows through the blades 37 in a direction generally perpendicular to their length. Air leaving the blades 37 then progressively turns back to align itself with the general flow direction.

The use of blades 37 angled forwardly and outwardly has the advantage that a larger total area of blading can be provided within a given overall diameter than in a conventional wind turbine with radially extending blades, reducing structural costs. Further, with angled blades 37 extending from a comparatively large hub 36, the degree of variation of tangential velocity (due to rotation) of points along the blades length is less than in a conventional wind turbine of the same diameter with radially extending blades. This reduces the performance penalty from use of simple, untwisted blades 37, as less blade twist is needed to maintain an optimum angle of attack along the entire length of blades 37.

Ring fairing 38 has been provided to rapidly turn inflowing air outward at the outer ends of blades 37 so that the outer ends are effective in generating aerodynamic lift, hence rotor torque, and to at least limit any component of flow along (rather than across) the blades 37. A secondary benefit is that ring fairing 38 prevents significant power losses due to tip vortex shedding that would occur at the tips of unshrouded blades. The ring fairing 38 in this regard acts similarly to so-called "end plates" on an aircraft wing.

However, it is thought that use of the ring fairing 38 coincidentally provides a still further benefit First, as described by Kling (see citation above), an airfoil shaped ring fairing, when unstalled and developing lift forces around its periphery, develops a circulatory flow around each point on its periphery. Because the ring fairing 38 is shaped so that these lift forces are inwardly directed, that flow is in the sense shown by arrow 60 in FIGS. 3 and 10, and so accelerates the airflow outwardly and backwardly through the blades 37, the effect increasing in intensity towards the outer ends of blades 37. At the same time, the tangential velocity of points on the blades 37 due to rotation increases towards their outer ends, i.e. with increasing radius. Without ring fairing 38, this latter effect would require twisting of the blade to maintain optimum loading of each blade 37. The effect of the circulatory flow around ring fairing 38 is to at least partially offset this Increased tangential velocity and so reduce the need for such twist. It is believed that this is a reason why simple untwisted blades 37 perform better in turbine 30 than they would otherwise be expected to do. Once given this insight, shape and dimension for airfoil section 40 should be able to be selected by otherwise routine methods or trial and error by a person skilled in wind turbine design to obtain satisfactory performance with simple blading.

It should be noted that the main reason for providing ring fairing 38 (outward turning of the flow) is totally different from that which motivated Kling, but serendipitously reduces the need for angled blades 37 to be twisted along their length and thus more difficult to make. Further, the shape of ring fairing 38 is quite different to that taught by Aylor (see above citation) in his embodiment with angled blades. (See FIG. 7 of U.S. Pat. No. 4,781,523). Aylor uses a ring fairing with an outwardly cambered cross-section which would develop outwardly and forwardly directed lift forces, precisely the opposite of those developed by ring fairing 38. This is done to turn the outlet air flow backward to move smoothly over the hollow body (Aylor's item 43) and to reduce the cross-sectional area of the flow passage at the outlet. Wind turbine 30 does neither. It should also be noted that Aylor's ring fairing is much larger and somewhat more complex in shape than ring fairing 38, increasing costs.

Many variations may be made without departing from the spirit and scope of the present invention. In particular, ordinary methods (eg computational fluid mechanics simulations) may be used to refine the design of wind turbines of the general form of wind turbine 30 for higher efficiency, or to tailor their designs for particular conditions, while retaining the benefits set out above. The former will generally involve more sophisticated blading and/or ring fairing airfoil section, where the extra cost may be justified.

Other parameters that may be varied include the vertex angle of hub 36, the shape of hub 36 (although the simple cone shown is preferred, being easy to make), blade chord, length, taper, area and blade angle settings relative to the hub 36.

Another possibility is to accept a slightly increased diameter for hollow body 31 and provide smooth fairing of hub 36 into hollow body 31. It is thought that some improvement in performance may result.

On the other hand it may be possible to simplify and cheapen wind turbine 38 by substituting a simpler sheet metal ring fairing, preferably cambered, for ring fairing 38, without major performance penalty.

It is of course to be emphasized that the invention disclosed herein is applicable to other applications in which it is desired to extract power from a moving fluid stream.

What is claimed is:

1. A fluid turbine for extraction of power from a moving fluid, including:
    a rotor mounted to a support structure for rotation about a horizontal axis, said rotor having a plurality of blades extending and angled forwardly and outwardly from a hub and sweeping a volume in the shape of an outwardly extending conical surface as the rotor rotates, the hub being shared to deflect fluid flow through the blades; and
    a ring fairing secured to said blades at outer ends thereof and rotatable with said blades about axis, said ring fairing being concentric with said axis of rotation,
    wherein said ring fairing has at leant one peripheral location having thereon a radial cross-section shaped to develop in operation of said turbine a circulatory flow about said cross section in such a direction as to increase the velocity of fluid flow between said ring fairing and said hub.

2. A fluid turbine according to claim 1 wherein at said at least one peripheral location on said ring fairing said ring fairing develops in operation of said turbine an aerodynamic force directed inwardly and rearwardly of said ring fairing.

3. A fluid turbine according to claim 1 wherein said ring fairing is of uniform cross section around substantially the entire periphery of said ring fairing.

4. A fluid turbine according to claim 1 wherein said ring fairing cross section is so shaped, sized and oriented that said circulatory flow is sufficient to at least partly offset that change direction of fluid flow relative to said blades due to the increase of tangential velocity of the blade with increasing radius of said blade.

5. A fluid turbine according to claim 1 wherein said hub is of substantially conical shape, with a vertex angle in the range of 60 degrees to 120 degrees.

6. A fluid turbine according to claim 5 in which said vertex angle is in the range of 80 degrees to 100 degrees.

7. A fluid turbine according to claim 1 wherein trailing edges of said blades in operation of said turbine sweep out an at least approximately conical surface.

8. A fluid turbine according to claim 7 wherein said conical surface intersects an external surface of said hub at an angle in the range of approximately 75 degrees to 90 degrees when both said surfaces are seen in a cross section in a radial plane that includes said axis of rotation.

9. A fluid turbine according to claim 7 wherein said conical surface intersects an external surface of said hub at approximately 90 degrees when both said surfaces are seen in a cross section in a radial plane that includes said axis of rotation.

10. A fluid turbine according to claim 1 wherein each said blade is of substantially constant cross-sectional shape along its length.

11. A fluid turbine according to claim 1 wherein each said blade is of airfoil-shaped cross-sectional shape.

12. A fluid turbine according to claim 1 wherein each said blade is substantially untwisted along its length.

13. A fluid turbine according to claim 1 wherein each said blade is formed of a sheet material and has a cross-sectional shape that is arcuate.

14. A fluid turbine according to claim 1 wherein said ring fairing cross section is at least approximately of airfoil shape.

15. A fluid turbine according to claim 14 wherein said airfoil shape has a camber line that is concave on a side thereof that is opposite to said blades.

16. A fluid turbine according to claim 1 wherein said ring fairing is formed of sheet material and wherein said ring fairing cross section is of arcuate shape.

17. A fluid turbine according to claim 16 wherein said arcuate shape is concave on a side thereof opposite to said blades.

18. A fluid turbine according to claim 1 wherein said ring fairing cross section has a leading edge and a trailing edge and wherein the distance when viewed in a radial plane including said axis of rotation between said leading and trailing edges is less than twice the maximum chord length of each said blade.

* * * * *